(12) United States Patent
Lee et al.

(10) Patent No.: US 9,340,668 B2
(45) Date of Patent: May 17, 2016

(54) THERMOPLASTIC RESIN COMPOSITION AND MOLDED ARTICLE USING THE SAME

(71) Applicant: Samsung SDI Co., Ltd., Yongin-si (KR)

(72) Inventors: Seon Ae Lee, Uiwang-si (KR); Min Kyoung Ham, Uiwang-si (KR); Young Chul Kwon, Uiwang-si (KR); Kang Yeol Park, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/724,964

(22) Filed: May 29, 2015

(65) Prior Publication Data

US 2015/0344685 A1    Dec. 3, 2015

(30) Foreign Application Priority Data

May 30, 2014 (KR) .................. 10-2014-0066206
May 28, 2015 (KR) .................. 10-2015-0074853

(51) Int. Cl.
*C08L 55/02* (2006.01)

(52) U.S. Cl.
CPC ............. *C08L 55/02* (2013.01); *C08L 2205/06* (2013.01)

(58) Field of Classification Search
CPC ...................................................... C08L 55/02
See application file for complete search history.

(56) References Cited

U.S. PATENT DOCUMENTS

2007/0276083 A1* 11/2007 Higashi .................... C08J 5/043
524/543

FOREIGN PATENT DOCUMENTS

| JP | 2001-262003 A | | 9/2001 | |
|---|---|---|---|---|
| JP | 2007-137963 A | * | 6/2007 | ............... C08K 3/08 |

* cited by examiner

*Primary Examiner* — Robert Harlan
(74) *Attorney, Agent, or Firm* — Additon, Higgins & Pendleton, P.A.

(57) ABSTRACT

A thermoplastic resin composition and a molded article including the same are disclosed. The thermoplastic resin composition includes: (A) a base resin including (a1) a styrene copolymer and (a2) a rubber-modified vinyl graft copolymer; and (B) surface-treated metal particles, wherein the surface-treated metal particles include: a metal core; a first coating layer formed on the metal core; and a second coating layer formed on the first coating layer. The thermoplastic resin composition can exhibit significantly improved glossiness and appearance by preventing flow marks and weld lines that can occur upon injection molding, while exhibiting a luxurious metallic texture even without painting.

15 Claims, No Drawings

THERMOPLASTIC RESIN COMPOSITION AND MOLDED ARTICLE USING THE SAME

CROSS-REFERENCE TO RELATED APPLICATIONS

This application claims priority to and the benefit of Korean Patent Application No. 10-2014-0066206, filed on May 30, 2014, and Patent Application No. 10-2015-0074853, filed on May 28, 2015, in the Korean Intellectual Property Office, the entire disclosure of each of which is incorporated herein by reference.

FIELD OF THE INVENTION

The present invention relates to a thermoplastic resin composition and a molded article using the same.

BACKGROUND

Recently, housings of electronic components, automotive components and the like complexly require various properties. In addition, plastic exterior products capable of realizing various colors are used as the housings. Further, these plastic exterior products can provide a more luxurious appearance to consumers by realizing a metallic texture on a surface thereof. To realize a metallic texture on the plastic exterior products, there is a method in which a molded article is manufactured from a plastic resin, followed by painting with a metal or metallic paint.

However, a metal-painted molded article has problems such as a complex process for painting, use of harmful solvents, and high manufacturing cost. In addition, when a painted plastic exterior material is used, there is a problem in that the painted plastic exterior material exhibits sharply deteriorated appearance quality since a painted portion thereof suffers from scratches even by slight impact.

To solve such problems, metal particles or the like can be added to a resin, whereby a molded article can exhibit an appearance of a luxurious metallic texture. Japanese Patent Laid-Open Publication No. 2001-262003 discloses a resin composition using scaly metal particles. Japanese Patent Laid-Open Publication No. 2007-137963 discloses a resin composition using glass fibers and metal particles. However, there is a problem in that the resin compositions disclosed therein can suffer from flow marks, weld lines or the like upon injection molding and thus can exhibit deterioration in appearance.

Therefore, there is a need for a thermoplastic resin composition for exterior materials capable of preventing flow marks and weld lines, which can occur upon injection molding and capable of providing improved gloss and appearance properties while maintaining original properties of a thermoplastic resin. In addition, there is a need for metal particles capable of realizing an appearance close to metal-painted products even without painting.

SUMMARY

Exemplary embodiments relate to a thermoplastic resin composition which includes: (A) a base resin including (a1) a styrene copolymer and (a2) a rubber-modified vinyl graft copolymer; and (B) surface-treated metal particles, wherein the surface-treated metal particles include: a metal core, a first coating layer formed on the metal core, and a second coating layer formed on the first coating layer.

The first coating layer may include an unsaturated double bond-containing silane compound.

The second coating layer may include a styrene copolymer.

The (B) surface-treated metal particles may include about 0.01% by weight (wt %) to about 5 wt % of the silane compound.

The (B) surface-treated metal particles may include about 1 wt % to about 20 wt % of the styrene copolymer.

The (B) surface-treated metal particles may have an average particle diameter of about 1 μm to about 20 μm.

The metal core may include any one of aluminum, copper, gold, zinc, chrome and/or alloys thereof.

The (B) surface-treated metal particles may be present in an amount of about 0.01 parts by weight to about 10 parts by weight based on about 100 parts by weight of the base resin.

The (A) base resin may include about 10 wt % to about 40 wt % of the (a1) styrene copolymer and about 60 wt % to about 90 wt % of the (a2) rubber-modified vinyl graft copolymer.

The (a1) styrene copolymer may be a copolymer of about 50 wt % to about 95 wt % of a styrene monomer and about 5 wt % to about 50 wt % of a comonomer copolymerizable therewith, wherein the comonomer may include at least one of an unsaturated nitrile compound, a (meth)acrylic acid alkyl ester compound, maleic anhydride, a maleimide compound, and mixtures thereof.

The (a2) rubber-modified vinyl graft copolymer may be a graft copolymer in which about 5 wt % to about 95 wt % of a vinyl monomer mixture is grafted to about 5 wt % to about 95 wt % of a rubbery polymer.

The vinyl monomer mixture may include: about 50 wt % to about 95 wt % of an aromatic vinyl compound, a (meth)acrylic acid alkyl ester compound or a mixture thereof; and about 5 wt % to about 50 wt % of an unsaturated nitrile compound, a maleimide compound or a mixture thereof.

The resin composition may further include at least one filler selected from among glass fibers, carbon fibers, glass beads, glass flakes, carbon black, kaolin, talc, mica, calcium carbonate, and/or wollastonite.

Exemplary embodiments also relate to a molded article including the resin composition as set forth above.

The molded article may have a flop index of about 7 to about 17, and may have a glossiness of about 90% or more as measured at an angle of 60° using a UGV-6P digital variable glossmeter.

Embodiments of the present invention can provide a thermoplastic resin composition, which can exhibit a luxurious metallic texture even without painting and can exhibit significantly improved gloss and appearance by preventing flow marks and weld lines that can occur upon injection molding, and a molded article thereof.

DETAILED DESCRIPTION

Hereinafter, embodiments of the present invention will be described in detail. It should be understood that the following embodiments are provided for complete disclosure and thorough understanding of the invention by those skilled in the art. In addition, unless otherwise stated, technical and scientific terms as used herein have meanings generally understood by those of ordinary skill in the art. Descriptions of known functions and constructions which can unnecessarily obscure the subject matter of the invention will be omitted.

As used herein, the term "(meth)acrylic" refers to methacrylic and/or acrylic.

According to exemplary embodiments of the present invention, a thermoplastic resin composition includes: (A) a base resin including a mixture of (a1) a styrene copolymer and (a2) a rubber-modified vinyl graft copolymer; and (B) surface-treated metal particles. In addition, the surface-treated metal particles include a first coating layer formed on a metal core and a second coating layer formed on the first coating layer. The thermoplastic resin composition according to exemplary embodiments can realize an appearance of a more similar texture to metal. In addition, the thermoplastic resin composition can exhibit significantly improved surface properties (appearance, texture, glossiness, and the like) by suppressing flow marks and weld lines that might occur upon injection molding.

(A) Base Resin (a1) Styrene Copolymer

In exemplary embodiments of the invention, the (a1) styrene copolymer may be a copolymer of a styrene monomer and a comonomer.

The styrene monomer may include substituted and/or unsubstituted styrene. Here, substituted styrene may be styrene in which at least one hydrogen atom directly bonded to a benzene ring is substituted with a $C_1$ to $C_8$ alkyl group and/or a halogen group. Examples of substituted styrene may include without limitation α-methylstyrene, p-methylstyrene, 2,4-dimethylstyrene, m-methylstyrene, o-methylstyrene, p-tert-butylstyrene, p-chlorostyrene, m-chlorostyrene, o-chlorostyrene, p-fluorostyrene, and/or p-cyclohexylstyrene.

In exemplary embodiments, the styrene monomer may be unsubstituted styrene. In this case, the resin composition after injection molding can have a high index of refraction and thus can realize an outstanding glossiness.

The styrene monomer may be present in an amount of about 50 wt % to about 95 wt %, based on the total weight (100 wt %) of the (a1) styrene copolymer. In some embodiments, the styrene copolymer may include the styrene monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of styrene monomer can be in a range from about any of the foregoing amounts to about any other of the foregoing amounts.

Within this range, the resin composition after injection molding can exhibit further improved gloss. In addition, within this range, the resin composition can exhibit excellent processability.

Examples of the comonomer may include without limitation unsaturated nitrile compounds, (meth)acrylic acid alkyl ester compounds, maleic anhydride, maleimide compounds, and the like, and mixtures thereof.

Examples of the unsaturated nitrile compound may include without limitation acrylonitrile, methacrylonitrile, and/or ethacrylonitrile. In exemplary embodiments, the unsaturated nitrile compound may be acrylonitrile. In this case, the resin composition after injection molding can exhibit improved mechanical strength and impact resistance.

The (meth)acrylic acid alkyl ester compound may be an ester of a $C_1$ to $C_8$ alkyl(meth)acrylic acid. The ester of the $C_1$ to $C_8$ alkyl(meth)acrylic acid may be an ester compound obtained from a monohydric alcohol containing 1 to 8 carbon atoms. Examples of the (meth)acrylic acid alkyl ester compound may include without limitation methyl(meth)acrylate, ethyl(meth)acrylate, propyl(meth)acrylate, butyl(meth)acrylate, and the like, and mixtures thereof.

Examples of the maleimide compound may include without limitation maleimide substituted with a $C_1$ to $C_4$ alkyl group, maleimide N-substituted with a phenyl group, and the like, and mixtures thereof.

The comonomer(s), such as the unsaturated nitrile compound, the (meth)acrylic acid alkyl ester compound, maleic anhydride, the maleimide compound, or the mixtures thereof, may be present in an amount of about 5 wt % to about 50 wt %, based on the total weight (100 wt %) of the (a1) styrene copolymer. In some embodiments, the styrene copolymer may include the comonomer(s) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of comonomer(s) can be in a range from about any of the foregoing amounts to about any other of the foregoing amounts.

Within this range, the resin composition after injection molding can exhibit improved mechanical strength and impact resistance.

Examples of the (a1) styrene copolymer may include without limitation: a copolymer of styrene and acrylonitrile; a copolymer of styrene, acrylonitrile and methyl methacrylate; a copolymer of α-methylstyrene and acrylonitrile; a copolymer of α-methylstyrene, acrylonitrile and methyl methacrylate; a copolymer of styrene, α-methylstyrene and acrylonitrile; a copolymer of styrene, α-methylstyrene, acrylonitrile and methyl methacrylate; and/or a copolymer of styrene and maleic anhydride.

In exemplary embodiments, the (a1) styrene copolymer may be a styrene-acrylonitrile copolymer. In this case, the resin composition can exhibit excellent thermal stability. In addition, the resin composition after injection molding can exhibit further improved glossiness.

The (a1) styrene copolymer may be copolymerized by a method selected from among emulsion polymerization, suspension polymerization, solution polymerization, and mass polymerization, without being limited thereto.

The (a1) styrene copolymer may have a weight average molecular weight from about 15,000 g/mol to about 250,000 g/mol, for example, about 150,000 g/mol to about 220,000 g/mol. Within this range, the thermoplastic resin composition can exhibit further improved moldability and processability.

(a2) Rubber-Modified Vinyl Graft Copolymer

According to the present invention, the (a2) rubber-modified vinyl graft copolymer may be a copolymer of a rubbery polymer and a vinyl monomer mixture.

The (a2) rubber-modified vinyl graft copolymer may be prepared by graft polymerization of about 5 wt % to about 95 wt % of the rubbery polymer and about 5 wt % to about 95 wt % of the vinyl monomer mixture. For example, the (a2) rubber-modified vinyl graft copolymer may be prepared by graft polymerization of about 40 wt % to about 60 wt % of the rubbery polymer and about 60 wt % to about 40 wt % of the vinyl monomer mixture.

In some embodiments, the (a2) rubber-modified vinyl graft copolymer may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the rubbery polymer can be in a range from about any of the foregoing amounts to about any other of the foregoing amounts.

In some embodiments, the (a2) rubber-modified vinyl graft copolymer may include the vinyl monomer mixture in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the vinyl monomer mixture can be in a range from about any of the foregoing amounts to about any other of the foregoing amounts.

Within this range, the (a2) rubber-modified vinyl graft copolymer can have an improved degree of grafting.

Here, the (a2) rubber-modified vinyl graft copolymer may be prepared by a graft polymerization method selected from among emulsion polymerization, suspension polymerization, solution polymerization and mass polymerization. In exemplary embodiments, emulsion polymerization or mass polymerization may be used. In this case, the (a2) rubber-modified vinyl graft copolymer can exhibit an improved degree of grafting and an improved yield, and it can be easy to control a molecular weight thereof.

Examples of the rubbery polymer may include without limitation butadiene rubbers, acrylic rubbers, ethylene-propylene rubbers, styrene-butadiene rubbers, acrylonitrile-butadiene rubbers, isoprene rubbers, terpolymers of ethylene-propylene-diene (EPDM), polyorganosiloxane-polyalkyl (meth)acrylate rubber composites, and the like, and the mixtures thereof.

The rubbery polymer may have an average particle diameter of about 0.05 μm to about 4 μm. Within this range, the resin composition can exhibit improved mechanical properties such as moldability, dimensional stability, impact resistance and the like.

The vinyl monomer mixture may include: about 50 wt % to about 95 wt % of an aromatic vinyl compound, a (meth) acrylic acid alkyl ester compound or a mixture thereof; and about 5 wt % to about 50 wt % of an unsaturated nitrile compound, a maleimide compound or a mixture thereof.

In exemplary embodiments, the vinyl monomer mixture may include: about 60 wt % to about 90 wt % of an aromatic vinyl compound, a (meth)acrylic acid alkyl ester compound or a mixture thereof; and about 10 wt % to about 40 wt % of an unsaturated nitrile compound, a maleimide compound or a mixture thereof.

In some embodiments, the vinyl monomer mixture may include the aromatic vinyl compound, (meth)acrylic acid alkyl ester compound or mixture thereof in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the aromatic vinyl compound, (meth)acrylic acid alkyl ester compound or mixture thereof can be in a range from about any of the foregoing amounts to about any other of the foregoing amounts.

In some embodiments, the vinyl monomer mixture may include the unsaturated nitrile compound, maleimide compound or mixture thereof in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the unsaturated nitrile compound, maleimide compound or mixture thereof can be in a range from about any of the foregoing amounts to about any other of the foregoing amounts.

The aromatic vinyl compound may include substituted and/or unsubstituted styrene. Here, the substituted styrene may be styrene in which at least one hydrogen atom directly bonded to a benzene ring is substituted with a $C_1$ to $C_8$ alkyl group and/or a halogen group. Examples of the substituted styrene may include without limitation α-methylstyrene, p-methylstyrene, 2,4-dimethylstyrene, m-methylstyrene, o-methylstyrene, p-tert-butylstyrene, p-chlorostyrene, o-chlorostyrene, m-chlorostyrene, p-fluorostyrene, and/or p-cyclohexylstyrene.

The (meth)acrylic acid alkyl ester compound may be an ester of a $C_1$ to $C_8$ alkyl(meth)acrylic acid. The ester of the $C_1$ to $C_8$ alkyl(meth)acrylic acid may be an ester compound obtained from a monohydric alcohol containing 1 to 8 carbon atoms. Examples of the (meth)acrylic acid alkyl ester compound may include without limitation methyl(meth)acrylate, ethyl(meth)acrylate, propyl(meth)acrylate, butyl(meth)acrylate, and the like, and mixtures thereof.

Examples of the unsaturated nitrile compound may include without limitation acrylonitrile, methacrylonitrile, and/or ethacrylonitrile.

Examples of the maleimide compound may include without limitation maleimide substituted with a $C_1$ to $C_4$ alkyl group, maleimide N-substituted with a phenyl group, and the like, and mixtures thereof.

In exemplary embodiments, the (a2) rubber-modified vinyl graft copolymer may be an acrylonitrile-butadiene-styrene (ABS) graft copolymer in which a mixture of styrene and acrylonitrile is grafted to a butadiene rubber, an acrylic rubber or a styrene-butadiene rubber. In this case, the resin composition can exhibit improved injection moldability and secondary processability.

In exemplary embodiments of the invention, the base resin may include about 10 wt % to about 40 wt % of the (a1) styrene copolymer and about 60 wt % to about 90 wt % of the (a2) rubber-modified vinyl graft copolymer, for example, the base resin may include about 15 wt % to about 35 wt % of the (a1) styrene copolymer and about 65 wt % to about 85 wt % of the (a2) rubber-modified vinyl graft copolymer.

In some embodiments, the base resin may include the (a1) styrene copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the (a1) styrene copolymer can be in a range from about any of the foregoing amounts to about any other of the foregoing amounts.

In some embodiments, the base resin may include the (a2) rubber-modified vinyl graft copolymer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the (a2) rubber-modified vinyl graft copolymer can be in a range from about any of the foregoing amounts to about any other of the foregoing amounts.

Within this range, the base resin can provide better prevention of flow marks or weld lines upon injection molding.

(B) Surface-Treated Metal Particles

In one embodiment of the invention, the metal particles may include at least one coating layer formed on a surface of a metal core by surface treatment of the metal core. In other words, the surface-treated metal particles include the metal core and one or more of coating layer formed on the metal core.

With this coating layer, the metal particles can prevent generation of weld lines or flow marks upon molding of the resin composition. In addition, the metal particles can simultaneously realize high glossiness and a luxurious metallic texture. A molded article manufactured using the thermoplastic resin composition including the metal particles can realize a metallic texture and high gloss similar to those of a painted molded article even without painting.

According to exemplary embodiments of the invention, the metal core serves to impart a metal texture, and may include, for example, at least one of aluminum, gold, copper, zinc, chrome and/or alloys thereof.

In one embodiment, the metal core may have a shape of a sphere or a plate. When spherical metal particles are used, the resin composition can provide better prevention of flow marks or weld lines caused by deformation of dispersion direction upon injection molding.

The metal cores may have an average particle diameter of about 0.01 µm to about 10 µm, for example, about 1 µm to about 10 µm. The metal particles including the metal core having an average particle diameter within this range can realize a luxurious pearl-like texture, sparkling properties, high glossiness and the like on a molded article. In addition, the resin composition can improve glossiness and suppress formation of weld lines and flow marks upon injection molding. In this case, the resin composition can realize an excellent metallic texture without metal painting. In exemplary embodiments, the metal cores may have an average particle diameter of 1 µm, 2 µm, 3 µm, 4 µm, 5 µm, 6 µm, 7 µm, 8 µm, 9 µm, or 10 µm.

As described above, the surface-treated metal particles include at least one coating layer. In exemplary embodiments, the surface-treated metal particles include the first coating layer formed on the surface of the metal particles and the second coating layer formed on the first coating layer.

The first coating layer may be formed of an unsaturated double bond-containing silane compound. For example, the first coating layer may be formed by coating the metal particles with the unsaturated double bond-containing silane compound.

The unsaturated double bond-containing silane compound may provide an organic functional group to the surface of the metal particles including the coating layer. In this case, the resin composition can prevent separation due to a difference in density between the metal particles and the base resin, and can exhibit improved dispersibility. As a result, the resin composition can realize an excellent metallic texture. In addition, the first coating layer can improve an index of refraction of the resin composition through chemical bonding to a styrene copolymer of the second coating layer described below. In this case, the resin composition after injection molding can achieve in improvement in gloss and brightness.

Examples of the unsaturated double bond-containing silane compound may include without limitation vinyltriethoxysilane, vinyltrimethoxysilane, vinyltriacetoxysilane, 3-methacryloxypropyltrichlorosilane, 3-methacryloxypropyltrimethoxysilane, 2-methacryloxyethyldimethyl(3-trimethoxysilylpropyl)ammonium chloride, allyltrimethoxysilane, allyltriethoxysilane, 3-acryloxypropyltrimethoxysilane, 3-(N-styrylmethyl-2-amino-ethylamino)propyltrimethoxysilane hydrochloride, vinyltrichlorosilane, and the like, and mixtures thereof.

The unsaturated double bond-containing silane compound may be a commercially available product. Examples of commercially available products may include, for example, Silquest®, Silquest® A-174, Silquest® 111, Silquest® 174NT (Momentive Performance Materials., Inc.), and the like, and mixtures thereof.

A method of forming the first coating layer on the metal cores may include, for example, surface modification (surface treatment) of the metal cores by introducing the silane compound onto the metal core. For example, the metal core and the silane compound may be introduced into a reactor, followed by vaporization through heating to a vaporization point of the silane compound in an inert gas atmosphere.

In exemplary embodiments, upon formation of the first coating layer, the silane compound may be introduced in an amount of about 1 part by weight to about 100 parts by weight, for example, about 1 part by weight to about 50 parts by weight, based on about 100 parts by weight of the metal cores introduced together. Within this range, the metal cores can have improved reactivity with the silane compound and a uniform coating layer can be formed.

The metal particles may include the first coating layer formed of the silane compound in an amount of about 0.01 wt % to about 5 wt % based on the total weight (100 wt %) of the metal particles including the first and second coating layers. For example, the metal particles including the first and second coating layers may include about 0.03 wt % to about 3 wt %, about 1 wt % to about 3 wt %, or about 1.5 wt % to about 3 wt % of the silane compound. In some embodiments, the metal particles may include the silane compound in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 wt %. Further, according to some embodiments of the present invention, the amount of the silane compound can be in a range from about any of the foregoing amounts to about any other of the foregoing amounts.

In this case, the first coating layer can further improve dispersibility of the metal particles in combination with the second coating layer. In addition, the resin composition can exhibit improvement in glossiness and appearance as well as mechanical properties.

The first coating layer may be formed to a thickness of, for example, about 10 nm to about 10 µm on the metal particles. If the first coating layer has the thickness as set forth above, the resin composition can exhibit improvement in gloss and brightness. As a result, the resin composition after injection molding can realize an excellent metallic texture and appearance. In exemplary embodiments, the first coating layer may have a thickness of about 100 nm to about 10 µm, about 0.5 µm to about 10 µm, about 0.5 µm to about 5 µm, or about 0.5 µm to about 3 µm.

The second coating layer may include a styrene copolymer. The styrene copolymer may be, for example, a copolymer formed from a styrene monomer mixture including: a styrene monomer; and an unsaturated nitrile compound, a (meth) acrylic acid alkyl ester compound, maleic anhydride, a maleimide compound, or a mixture thereof.

The second coating layer may be formed by surface treatment of the first coating layer-formed metal particles with the styrene monomer mixture. For example, the metal particles including the first and second coating layers may be manufactured by forming the first coating layer through coating the surface of the metal cores with the silane compound, followed by suspension polymerization of the first metal layer-formed metal particles and the styrene monomer mixture. In this case, the second coating layer may be formed by reaction between a functional group present on the first coating layer and a carbon double bond of the styrene monomer mixture. As described above, when including one or more (for example, two) coating layers, the metal particles can exhibit further improved compatibility with a matrix resin, and can exhibit further improved brightness and glossiness by significant improvement in dispersibility.

In exemplary embodiments, upon formation of the second coating layer, the styrene monomer mixture may be introduced in an amount of about 1 part by weight to about 200 parts by weight, for example, about 1 part by weight to about 100 parts by weight, or about 1 part by weight to about 50 parts by weight, based on about 100 parts by weight of the metal cores. Within this range, the metal cores can exhibit improved reactivity with the styrene monomer mixture and a uniform coating layer can be formed.

The metal particles may include the second coating layer including the styrene copolymer formed of the styrene monomer mixture in an amount of about 0.1 wt % to about 20 wt %, based on the total weight (100 wt %) of the metal particles including the first and second coating layers. For example, the metal particles including the first and second coating layers may include about 3 wt % to about 20 wt %, about 5 wt % to about 20 wt % or about 5 wt % to about 15 wt % of the styrene copolymer. In some embodiments, the metal particles may include the styrene copolymer in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the styrene copolymer can be in a range from about any of the foregoing amounts to about any other of the foregoing amounts.

Within this range, the second coating layer can further improve dispersibility of the metal particles in combination with the first coating layer as set forth above.

The second coating layer may be formed to a thickness of, for example, 10 nm to about 10 µm on the first coating layer-formed metal particles. If the second coating layer satisfies the thickness as set forth above, the resin composition can exhibit improvement in glossiness and brightness. As a result, the resin composition after injection molding can realize an excellent metallic texture and appearance. In exemplary embodiments, the second coating layer may have a thickness of about 100 nm to about 10 µm, about 0.5 µm to about 10 µm, about 0.5 µm to about 5 µm, or about 0.5 µm to about 3 µm.

The metal particles including the first and second coating layers may have an average particle diameter of about 1 µm to about 20 µm, for example, about 2 µm to about 15 µm. Within this range, the metal particles including the first and second coating layers can exhibit improved dispersibility in the matrix resin. In addition, the metal particles including the first and second coating layers can realize a luxurious pearl-like texture, sparkling properties, high glossiness and the like on a molded article. Further, the resin composition can improve glossiness and suppress formation of weld lines and flow marks upon injection molding. In this case, the resin composition can realize an excellent metallic texture without metal painting. In exemplary embodiments, the metal particles may have an average particle diameter of 2 µm, 3 µm, 4 µm, 5 µm, 6 µm, 7 µm, 8 µm, 9 µm, 10 µm, 11 µm, 12 µm, 13 µm, 14 µm, or 15 µm.

The thermoplastic resin composition may include the (B) surface-treated metal particles in an amount of about 0.01 parts by weight to about 10 parts by weight, for example, about 0.02 parts by weight to about 5 parts by weight, based on about 100 parts by weight of the (A) base resin. In exemplary embodiments, the thermoplastic resin composition may include the (B) surface-treated metal particles in an amount of about 0.05 parts by weight to about 5 parts by weight, about 0.1 parts by weight to about 5 parts by weight, about 1 part by weight to about 5 parts by weight, or about 1 part by weight to about 3 parts by weight, based on about 100 parts by weight of the (A) base resin. In some embodiments, the thermoplastic resin composition may include the (B) surface-treated metal particles in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the (B) surface-treated metal particles can be in a range from about any of the foregoing amounts to about any other of the foregoing amounts.

Within this range, a molded article can exhibit improvement in metallic texture, gloss and appearance.

According to the present invention, the thermoplastic resin composition may further include at least one filler selected from the group consisting of glass fibers, carbon fibers, glass beads, glass flakes, carbon black, kaolin, talc, mica, calcium carbonate, and/or wollastonite. In this case, the thermoplastic resin composition can exhibit further improved moldability and appearance.

In exemplary embodiments, the thermoplastic resin composition may further include at least one filler selected from among glass fibers, talc, and/or wollastonite. In this case, the resin composition can realize high-quality surface properties and can exhibit a further improved metallic texture.

In exemplary embodiments, the glass fibers may have an average length of about 0.1 mm to about 20 mm, for example about 0.3 mm to about 10 mm. In exemplary embodiments, the glass fibers may have an aspect ratio of about 10 to about 2000, for example about 30 to about 1000.

In addition, the thermoplastic resin composition according to the present invention may further include one or more additives. Examples of the additives may include without limitation antimicrobials, heat stabilizers, antioxidants, release agents, photostabilizers, surfactants, coupling agents, plasticizers, admixtures, colorants, lubricants, antistatic agents, flame retardant agents, weatherproof agents, UV absorbers, adhesive aids, adhesives, and the like. These additives may be used alone or in combination thereof.

The antioxidants may include, for example, phenol-type, phosphite-type, thioether-type, and/or amine-type antioxidants.

The release agents may include, for example, fluorine-containing polymers, silicone oil, metal salts of stearic acid, metal salts of montanic acid, montanic acid ester wax, and/or polyethylene wax.

The weatherproof agents may include, for example, benzophenone-type, benzotriazol-type, and/or phenyltriazine-type weatherproof agents.

The additives may be present in a suitable amount so long as the additives do not deteriorate properties of the resin composition. In exemplary embodiments, the additives may be present in an amount of 40 parts by weight or less, for example, about 0.1 parts by weight to about 30 parts by weight, based on about 100 parts by weight of the base resin. Within this range, the molded article can have further improved properties depending on purposes thereof.

The thermoplastic resin composition may be prepared by a typical method. For example, the thermoplastic resin composition may be prepared into pellets by simultaneously mixing the components according to the present invention with other optional additive(s), followed by melt extrusion in an extruder.

Exemplary embodiments provide a molded article manufactured using the thermoplastic resin composition as set forth above.

The molded article may be manufactured by various processes such as injection molding, blow molding, extrusion, thermoforming, and the like. Exemplary embodiments of the molded article scarcely suffers from flow marks and weld lines. In addition, exemplary embodiments of the molded articles can have a luxurious metallic texture, for example, plastic housings of IT products, home appliances, automotive interior/exterior products, furniture, interior decorations, miscellaneous goods, and the like.

According to one embodiment of the invention, a molded article exhibits an excellent metallic texture. In the present invention, a flop index is used as an index of metal texture.

According to the embodiment of the invention, the flop index of the molded article can be represented by Equation 1:

$$\text{Flop Index} = \frac{2.69(L^*_{15°} \cdot L^*_{110°})^{1.11}}{(L^*_{45°})^{0.86}}$$

wherein $L^*(x°)$ refers to luminance measured at $x°$.

The flop index is a value obtained by measuring a change in reflectance by rotating a reflection angle and is generally calculated according to Equation 1 by measuring luminance ($L^*$) of reflected light at each of 15°, 45° and 110°. According to the present invention, the flop index is measured using a BYK Mac spectrophotometer (BYK Co., Ltd.).

A surface without a metallic texture has a flop index of 0; metal has a flop index of about 15 to about 17; a metallic texture coating used for automotive body painting has a flop index of about 11; and a surface with a perceivable metallic texture has a flop index of about 6.5 or more.

In one embodiment, the molded article may have a flop index of about 7 to about 17, for example, about 7 to about 13, and as another example about 9 to about 12. Within this range, it can be easy to realize an appearance having a metallic texture.

According to exemplary embodiments, the molded article can exhibit excellent glossiness. The glossiness is an index indicating brightness such as metallic gloss, and is measured as a gloss level at an angle of 60° using a UGV-6P digital variable glossmeter (SUGA Co., Ltd.).

In exemplary embodiments, the molded article may have a glossiness of about 90% or more, for example about 92% or more. Within this range, it can be easy to realize an appearance having a metallic texture.

The molded article manufactured using the thermoplastic resin composition can provide a metallic texture without separate painting, and the metallic texture of the molded article can be confirmed based on a gloss level and a flop index that is a performance index of the molded article. In addition, the molded article may scarcely suffer from weld lines and flow marks.

Hereinafter, the present invention will be described in more detail with reference to the following examples. It should be understood that these examples are not to be construed in any way as limiting the present invention.

Details of components used in Examples and Comparative Examples are as follows.

(A) Base Resin (a1) Styrene Copolymer

A styrene-acrylonitrile (SAN) copolymer which has a weight average molecular weight of 150,000 g/mol prepared by suspension polymerization of 75 parts by weight of styrene and 25 parts by weight of acrylonitrile at 75° C. for 5 hours is used.

(a2) Rubber-Modified Vinyl Graft Copolymer

Polybutadiene rubber latex is introduced into a reactor such that butadiene is present in an amount of 45 parts by weight based on the total amount of a monomer. Next, as additives, 1.0 part by weight of potassium oleate, 0.4 parts by weight of cumene hydroperoxide and 0.3 parts by weight of a t-dodecylmercaptan chain transfer agent are added to a mixture of 39 parts by weight of styrene, 16 parts by weight of acrylonitrile and 150 parts by weight of deionized water, and left at 75° C. for 5 hours for reaction, thereby preparing ABS graft latex. A 1% sulfuric acid solution is added to the polymer latex, followed by coagulation and drying, thereby preparing a graft copolymer in a powder state.

(B) Metal Particles Including First and Second Coating Layers

In a Taylor-Couette reactor, aluminum metal cores having an average particle diameter of 8 μm and a silane compound Silquest A-174 are placed in a ratio of 1 wt %:5 wt %, followed by surface treatment at a flow rate of 5 ml/sec to 12 ml/sec and at 500 rpm to 1500 rpm, thereby forming a first coating layer on the aluminum particles. Next, a styrene copolymer mixture including an acrylonitrile monomer and a styrene monomer and the first coating layer-formed particles are subjected to suspension polymerization in a weight ratio of 2:1, thereby forming a second coating layer. The prepared metal particles including first and second coating layers are evaluated as to the degree of coating using TEM.

Here, the first coating layer formed of the silane compound is present in an amount of 3 wt % in the metal particles, and the second coating layer formed of the styrene copolymer mixture is present in an amount of 15 wt % in the metal particles.

(C) Metal Particles

Metal particles obtained by surface treatment of aluminum particles having an average particle diameter of 8 μm with aminopropyltrimethoxysilane are used. Here, aminopropyltrimethoxysilane is present in an amount of 3 wt % in the total weight of the surface-treated metal particles.

Examples 1 to 4

The components as set forth above are mixed in amounts as listed in Table 1, thereby preparing a thermoplastic resin composition. The prepared thermoplastic resin composition is extruded at 240° C. in a typical twin-screw extruder, thereby preparing an extrudate in pellet form. Next, properties of the extrudate are evaluated. Results are shown in Table 2.

Comparative Example 1

An extrudate is prepared in the same manner as in Example 1 except that the (C) metal particles are used instead of the (B) metal particles including the first and second coating layers.

(Evaluation of Properties)

1) Metallic Texture

A flop index is evaluated using a spectrophotometer (model: BYK Mac, BYK Co., Ltd.). Luminance ($L^*$) of reflected light at angles of 15°, 45° and 110° is measured on each of the pellet-shaped extrudates prepared in Examples 1 to 4 and Comparative Example 1, followed by calculation of the flop index according to Equation 1:

$$\text{Flop Index} = \frac{2.69(L^*_{15°} \cdot L^*_{110°})^{1.11}}{(L^*_{45°})^{0.86}}$$

wherein $L^*(x°)$ refers to luminance measured at $x°$.

2) Injection Molded Appearance

Since injection molding is performed using a mold having two gates, there is a possibility of generation of flow marks or weld lines. An injection-molded product is observed with the naked eye and evaluated based on the following criteria. Results are shown in Table 1.

⊚. No different color on flow marks or weld lines

O: Different color on 1 to 2 portions of weld lines despite no flow marks

Δ: Different color on 3 to 9 portions of flow marks and weld lines

X: Different color on 10 or more portions of flow marks and weld lines

3) Glossiness

A gloss level at an angle of 60° C. is measured using a UGV-6P digital variable glossmeter (SUGA Co., Ltd.).

TABLE 1

| Component | Example | | | | Comparative Example |
|---|---|---|---|---|---|
| | 1 | 2 | 3 | 4 | 1 |
| (a1) | 20 | 20 | 20 | 20 | 20 |
| (a2) | 80 | 80 | 80 | 80 | 80 |
| (B) | 1 | 5 | 0.1 | 10 | — |
| (C) | — | — | — | — | 1 |

Unit of (a1) and (a2): wt %
Unit of (B) and (C): parts by weight based on 100 parts by weight of (a1) + (a2)

TABLE 2

| Property | Example | | | | Comparative Example |
|---|---|---|---|---|---|
| | 1 | 2 | 3 | 4 | 1 |
| Metallic texture (flop index) | 9 | 11 | 7 | 12 | 9 |
| Flow marks | ⊚ | ⊚ | ⊚ | ⊚ | X |
| Weld lines | ⊚ | ⊚ | ⊚ | ⊚ | X |
| Glossiness (%) | 95 | 97 | 92 | 96 | 95 |

In Table 1, the thermoplastic resin compositions of Examples 1 to 4 have a high flop index and thus exhibit a luxurious metallic texture. In addition, the thermoplastic resin compositions of Examples 1 to 4 did not suffer from flow marks or weld lines and thus exhibit an excellent appearance, and have a high gloss of about 92 or more. Conversely, since the thermoplastic resin composition of Comparative Example 1 includes the metal particles which are not subjected to double coating, the thermoplastic resin composition of Comparative Example 1 has a significantly negative appearance due to severe formation of flow marks and weld lines.

Although the present invention has been described with reference to some embodiments, it should be understood that the foregoing embodiments are provided for understanding of the present invention and are not to be construed in any way as limiting the present invention, and that various modifications, changes, alterations, and equivalent embodiments can be made by those skilled in the art without departing from the spirit and scope of the invention. Therefore, the scope of the invention should be limited only by the accompanying claims and equivalents thereof.

What is claimed is:

1. A thermoplastic resin composition comprising:
(A) a base resin comprising (a1) a styrene copolymer and (a2) a rubber-modified vinyl graft copolymer; and (B) surface-treated metal particles,
wherein the surface-treated metal particles comprise a metal core, a first coating layer formed on the metal core, and a second coating layer formed on the first coating layer.

2. The resin composition according to claim 1, wherein the first coating layer comprises an unsaturated double bond-containing silane compound.

3. The resin composition according to claim 1, wherein the second coating layer comprises a styrene copolymer.

4. The resin composition according to claim 2, wherein the (B) surface-treated metal particles comprise about 0.01 wt % to about 5 wt % of the silane compound.

5. The resin composition according to claim 3, wherein the (B) surface-treated metal particles comprise about 1 wt % to about 20 wt % of the styrene copolymer.

6. The resin composition according to claim 1, wherein the (B) surface-treated metal particles has an average particle diameter of about 1 μm to about 20 μm.

7. The resin composition according to claim 1, wherein the metal core comprises aluminum, copper, gold, zinc, chrome, and/or alloys thereof.

8. The resin composition according to claim 1, comprising the (B) surface-treated metal particles in an amount of about 0.01 parts by weight to about 10 parts by weight based on about 100 parts by weight of the base resin.

9. The resin composition according to claim 1, wherein the (A) base resin comprises about 10 wt % to about 40 wt % of the (a1) styrene copolymer and about 60 wt % to about 90 wt % of the (a2) rubber-modified vinyl graft copolymer.

10. The resin composition according to claim 1, wherein the (a1) styrene copolymer is a copolymer comprising about 50 wt % to about 95 wt % of a styrene monomer and about 5 wt % to about 50 wt % of a comonomer copolymerizable therewith, the comonomer comprising an unsaturated nitrile compound, a (meth)acrylic acid alkyl ester compound, maleic anhydride, a maleimide compound, or a mixture thereof.

11. The resin composition according to claim 1, wherein the (a2) rubber-modified vinyl graft copolymer is a graft copolymer in which about 5 wt % to about 95 wt % of a vinyl monomer mixture is grafted to about 5 wt % to about 95 wt % of a rubbery polymer.

12. The resin composition according to claim 11, wherein the vinyl monomer mixture comprises: about 50 wt % to about 95 wt % of an aromatic vinyl compound, a (meth)acrylic acid alkyl ester compound or a mixture thereof; and about 5 wt % to about 50 wt % of an unsaturated nitrile compound, a maleimide compound or a mixture thereof.

13. The resin composition according to claim 1, further comprising glass fibers, carbon fibers, glass beads, glass flakes, carbon black, kaolin, talc, mica, calcium carbonate, and/or wollastonite.

14. A molded article comprising the thermoplastic resin composition according to claim 1.

15. The molded article according to claim 14, wherein the molded article has a flop index of about 7 to about 17 and a glossiness of about 90% or more as measured at an angle of 60° using a UGV-6P digital variable glossmeter.

* * * * *